United States Patent [19]

Gaytan et al.

[11] Patent Number: 5,689,509
[45] Date of Patent: Nov. 18, 1997

[54] APPARATUS AND METHOD FOR PACKETIZING AND SEGMENTING MPEG PACKETS

[75] Inventors: Andre J. Gaytan, Union City; Denny Gentry, Palo Alto; Rasoul Oskouy, Fremont, all of Calif.

[73] Assignee: Sun Microsystems, Inc., Mountain View, Calif.

[21] Appl. No.: 748,554

[22] Filed: Nov. 8, 1996

Related U.S. Application Data

[63] Continuation of Ser. No. 499,226, Jul. 7, 1995, abandoned.
[51] Int. Cl.[6] ................... H04J 3/00; H04N 7/08
[52] U.S. Cl. ............... 370/396; 370/403; 370/474; 348/465; 348/467
[58] Field of Search ................... 370/389, 395, 370/396, 400, 401, 402, 403, 470, 471, 472, 473, 474; 348/6.7, 426, 441, 460, 461, 465, 467, 469, 473, 474

[56] References Cited

U.S. PATENT DOCUMENTS

| | | | |
|---|---|---|---|
| 5,260,783 | 11/1993 | Dixit | 370/94.2 |
| 5,448,568 | 9/1995 | Delpuch et al. | 370/94.2 |
| 5,467,342 | 11/1995 | Logston et al. | 370/60.1 |
| 5,481,542 | 1/1996 | Logston et al. | 370/94.2 |
| 5,481,543 | 1/1996 | Veltman | 370/94.1 |
| 5,541,917 | 7/1996 | Farris | 370/60.1 |
| 5,544,161 | 8/1996 | Bigham et al. | 370/58.1 |

*Primary Examiner*—Alpus H. Hsu
*Attorney, Agent, or Firm*—Blakely Sokoloff Taylor & Zafman

[57] ABSTRACT

A circuit and method for optimizing efficiency in transferring a block of data having a plurality of frames of limited size from a memory element. The circuit comprises a transmit ("TX") DMA engine and a TX Segmentation engine. The TX DMA engine is responsible for accessing overhead information for the block of data within a TX data buffer from a data descriptor dedicated to that particular TX data buffer. The TX DMA engine is further responsible for reading the block of data from the memory element to be stored local thereto. The TX Segmentation engine is responsible for segmenting the block of data into a plurality of cell packets corresponding in number to the plurality of frames. Each cell packet contains in common the overhead information for the block of data to avoid the TX DMA engine re-accessing the data descriptor to obtain the same overhead information for each frame being transferred.

20 Claims, 9 Drawing Sheets

APPARATUS AND METHOD FOR PACKETIZING AND SEGMENTING MPEG PACKETS

CROSS-REFERENCES TO RELATED APPLICATIONS

This is a Continuation of a U.S. patent application (applicaton Ser No. 08/499,226) filed Jul. 7, 1995, now abandoned.

BACKGROUND OF THE INVENTION

1. Field of the Invention

The present invention relates to the field of data transfer. More particularly, the present invention relates to an apparatus and method for packetizing data, which is sequentially stored and accessible in host memory, into a plurality of data packets for later segmentation in order to reduce overhead and increase data bandwidth.

2. Description of Art Related to the Invention

It is well known that an asynchronous transfer mode ("ATM") network enables different types of systems, such as computer systems, to communicate with each other. Like most networks, overall performance of an ATM network is significantly influenced by a number of factors. One factor, pertinent to the present application, is data bandwidth of an interface circuit which establishes a transmit ("TX") data path between a system bus of a computer system and network media (e.g., fiber optics, twisted pair, super twisted pair, etc.). For the scope of this application, "data bandwidth" is represented by a ratio of the amount of data transmitted from the computer system through the TX data path for an amount of software overhead. "Software overhead" is defined as control information required for operating system functions to perform the data transfer.

One primary disadvantage experienced by conventional ATM networks is that there exists frame size constraints for point-to-point video and other communicative data which precludes enhancement of data bandwidth by simply increasing the amount of data controlled by a given amount of software overhead. For example, video is transferred through Moving Pictures Experts Group ("MPEG") frames which are 188 bytes of data stored consecutively in host memory. The byte size of a single MPEG frame, like all size-limited frames, cannot be altered in situations where software overhead is large compared to the size of the MPEG frame. In conventional networks, each MPEG frame is separately accessed by communications software and transferred into the interface circuit for local storage. It is apparent that the data bandwidth is greatly reduced if the ATM network requires a large software overhead to transfer a single MPEG frame into the interface circuit. Hence, it would be advantageous to create an apparatus and method for overcoming the above-described disadvantage.

SUMMARY OF THE INVENTION

To minimize software overhead used in controlling a data transfer and thereby increase data bandwidth, hardware circuitry is implemented within a Network Interface Circuit ("NIC") to control and perform the data transfer. The hardware circuitry comprises a transmit ("TX") DMA engine and a TX Segmentation engine.

After accessing overhead from a data descriptor in order to subsequently access a data block having a number MPEG frames, the TX DMA engine packetizes the data block into MPEG packets corresponding in number and size to the MPEG frames. These MPEG packets are stored local to the NIC. The manner in which the MPEG packets are stored differs from normal data in that the TX DMA engine does not need to re-access overhead information from the same data descriptor for successive MPEG packets originating from the same data block. Rather, certain overhead parameters are stored locally before storage of the first MPEG packet and these certain overhead parameters are used by the TX Segmentation engine for segmenting successive MPEG packets of the same data block. This increases the overall data bandwidth realized by the system using the hardware circuitry.

Upon detecting that the data block is being stored as MPEG packets, the TX Segmentation engine is configured to segment data of the MPEG packets as payload for transmit cells of a cell packet and to retrieve the overhead parameters as needed to produce a cell packet for each MPEG packet. After all the MPEG frames associated with the data block are read by the TX DMA engine and stored locally, the NIC writes to a TX completion ring in host memory to inform communications software that the data block has been fully transferred.

BRIEF DESCRIPTION OF THE DRAWINGS

The features and advantages of the present invention will become apparent from the following detailed description of the present invention in which.

DETAILED DESCRIPTION OF THE INVENTION

In the following detailed description, the present invention describes an apparatus and method for segmenting data stored in host memory. Such segmentation is performed within a Network Interface Circuit ("NIC") of an asynchronous transfer mode ("ATM") network. A number of terms are frequently used to describe certain control circuits and binary representations which are defined herein. "Data"

generally refers to binary data. A "word" is preferably 4 bytes (32-bits) in length but may be any "$2^x$" byte in length where $x \geq 0$ while a "packet" is a plurality of words stored consecutively. A "data block" is defined as a group of consecutively addressed bytes stored in a transmit ("TX") data buffer while a "MPEG frame" is used to refer to a size-limited portion of the data block of any type of communicative data including video. The MPEG frame is preferably 188 bytes in length but may be of any byte length. A "MPEG packet" corresponds in size and data content to the MPEG frame but is stored in the TX buffer memory instead of the TX data buffer. Lastly, "packet(izes, ization, izing)" refers to the operations necessary for segmenting the data block into packets of data.

Figure 1:
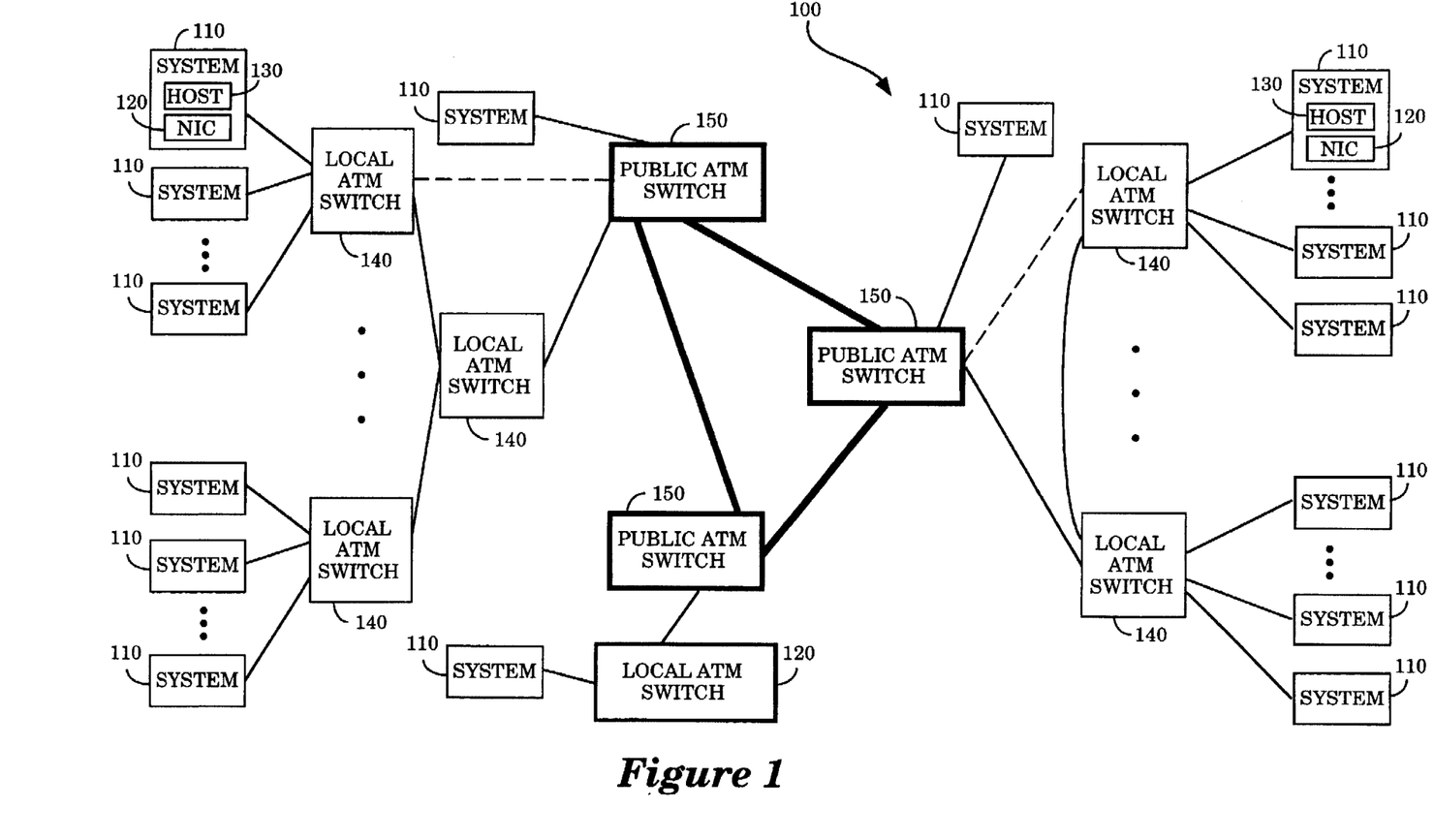
FIG. 1 is an illustrative block diagram of an ATM network including systems having host memory coupled together through switching circuitry and dedicated Network Interface Circuits.

Referring to FIG. 1, an exemplary network incorporating the Network Interface Circuit ("NIC") of the present invention is shown. The network 100 comprises various systems e.g., computer system (not shown) each of which incorporates host memory and a NIC 120 as shown. The NICs 120 may be coupled directly to a public ATM switch 150 or indirectly via a local ATM switch 140. Likewise, the local and public switches 140 and 150 may be coupled in any chosen scheme to provide communication paths between two or more systems. According to the quality of service (i.e., bit rate, acceptable timing loss, etc.) required, these local and public ATM switches 140 and 150 route data to support asynchronously transfers between applications running on systems remotely located from each other. In FIG. 1, the network 100 may also include systems which utilize local area network ("LAN") emulation which serves as a gateway connecting other networks, such as Ethernet or Token Ring networks which use ATM as a supporting framework.

Figure 2:
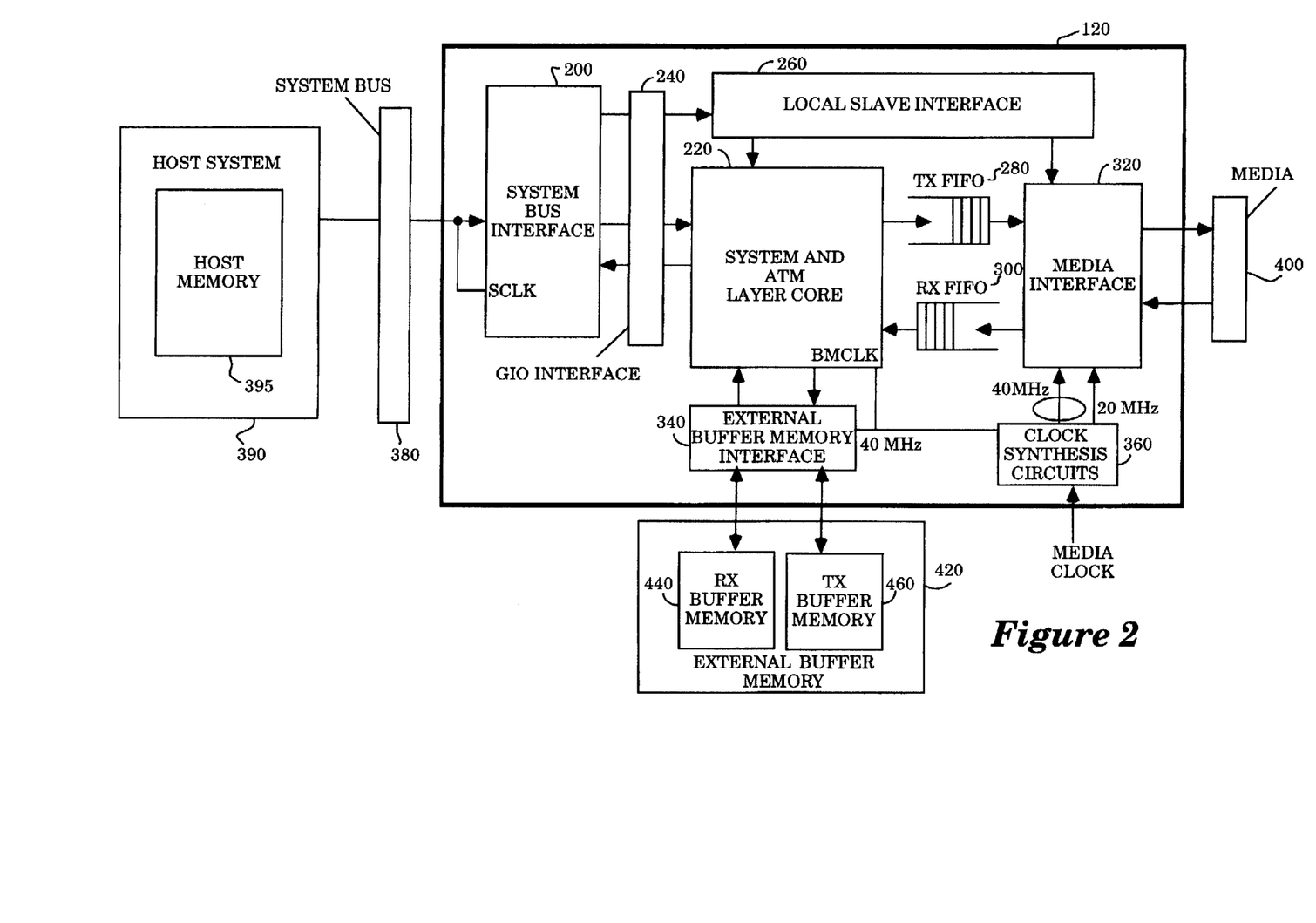
FIG. 2 is an illustrative block diagram of the Network Interface Circuit of FIG. 2 including a System and ATM Layer Core.

Referring now to FIG. 2, a simplified diagram of the architecture of the NIC used in accordance with one of the systems of FIG. 1 (hereinafter referred to as a "host system") is shown. The NIC 120 interfaces the host system 390 coupled through an input/output ("I/O") bus (e.g., System Bus) 380 to the network media operating in accordance with ATM protocol. The NIC 120 comprises a System Bus interface 200, a System and ATM Layer Core 220 which is coupled to the System Bus interface 200 via a Generic Input/Output ("GIO") interface 240, a Local Slave interface 260, an array of transmit ("TX") FIFOs 280, an array of receive ("RX") FIFOs 300, a Media interface 320, an External Buffer Memory interface 340 and Clock Synthesis circuit 360.

Together, the components 200–360 of the NIC 120 cooperate to asynchronously transfer data between the host system 390 and the other systems in the network through multiple, dynamically allocated channels in multiple bandwidth groups. In other words, the components of the NIC 120 collectively function as a multi-channel intelligent direct memory access (DMA) controller coupled to the System Bus 380 of the host system 390. In a preferred embodiment, multiple transmit and receive channels are serviced as virtual channels utilizing a full duplex 155/622 Mbps physical link.

Figure 7:
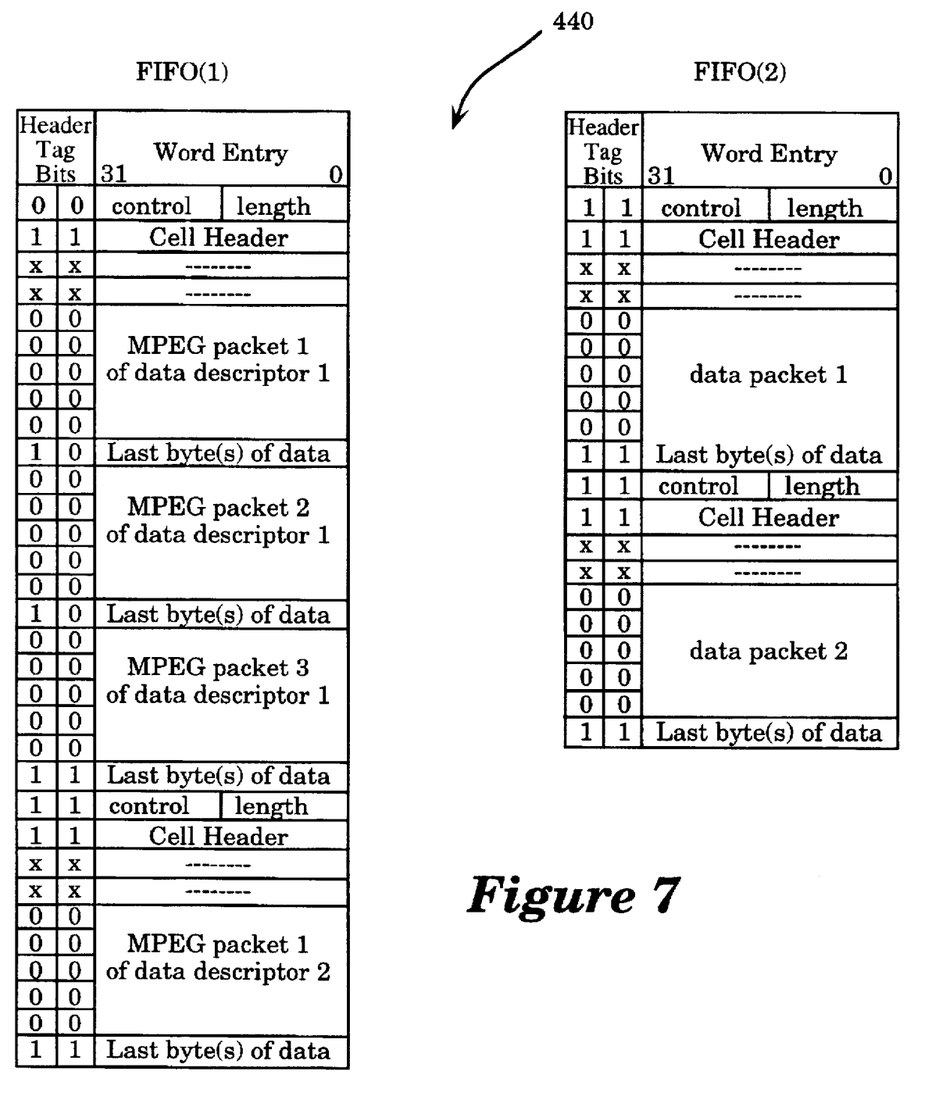
FIG. 7 is an illustrative block diagram of how MPEG packets and non-MPEG packets are stored in a FIFO of the TX buffer memory of FIG. 2.

Multiple packets of data, subscribed to different channels over the System Bus 380 to external buffer memory 420 residing off the NIC 120 via the External Buffer Memory interface 340, are segmented by circuitry in the System and ATM Layer Core 220 into transmit cells for transmission to the Media 400 through Media interface 320. The external buffer memory 420 includes RX buffer memory 440 and TX buffer memory 460 which preferably is a plurality of FIFOs, one FIFO corresponding to each channel of the network in order to support different data transfer rates. Each FIFO has sufficient storage capabilities to store (i) a plurality of header tag bits for providing control information for segmentation purposes and (ii) a corresponding plurality of entries allowing at least one word of data to be read for each clock cycle and temporarily stored in a single entry as shown in FIG. 7.

Referring still to FIG. 2, the System and ATM Layer Core 220 comprises segregated cellification and reassembly logic (not shown) to facilitate asynchronous cellification and reassembly of transmit and receive data cells, respectively. The array of TX and RX FIFOs 280 and 300, coupled between the System and ATM Layer Core 220 and Media interface 320, are used to stage the transmit and receive cell payloads of the transmit and receive data cells respectively. The Media interface 320 transmits and receives these data cells to the Media 400 of the network, driven by clock signals provided by Clock Synthesis circuit 360. Preferably the Media 400, and therefore the Media interface 320, conforms to the Universal Test and Operations Physical interface for ATM ("UTOPIA") standard, as described by the ATM Form Ad Hoc specification. To conform to the UTOPIA specification, the clock synthesis circuit 360 provides either a clock signal of 20 MHz or 40 MHz to enable the Media interface 320 to support a byte stream at 20 MHz for 155 Mbps or a 16 bit stream at 40 MHz for a 622 Mbps data stream.

In the present embodiment, the Media interface 320 receives 52-byte data cells each having a 4-byte cell header and a 48-byte payload from the TX FIFO 280. The Media interface 320 inserts a checksum as a fifth byte into the cell header of each transmit cell prior to providing one or more 53-byte transmit cells (hereinafter referred to as a "cell packet") to the Media 400. The last transmit cell includes control and length information, padding (if necessary) and a Cyclic Redundancy Checkword "CRC". Conversely, when the Media interface 320 receives cells from the Media 400, it examines the checksum in the fifth byte of each receive cell to determine if the checksum is correct. If so, the byte representing the checksum is stripped from the receive cell and it is forwarded to the RX FIFO 300. Otherwise, the entire receive cell is disregarded.

The System Bus interface 200 and GIO interface 240 insulate the host system 390 from the specifics of the transfer to the Media 400. Furthermore, the System and ATM Layer Core 220 are insulated from the specifics of the system bus 380 and host specifics. In the present preferred embodiment, the System Bus is an S-Bus, as specified in the Institute of Electronics and Electrical Engineers ("IEEE") standard 1496 specification. The System Bus interface 200 is configured to communicate in accordance with the specifications of the System Bus, in the present illustration, the S-Bus. It is contemplated that the System Bus interface 200 can be configured to conform to different host system busses. The System Bus interface 200 is also configured to transfer and receive data in accordance with the protocols specified by the GIO interface 240. The GIO interface 240 provides a singular interface through which the System and ATM Layer Core 220 communicates with the host system 390 and therefore, does not change for different embodiments of the NIC 120 which interface to different host systems and busses.

The host system 390 includes host memory 395 which contains data packets and pointers to the packets being transmitted and received. As noted previously, the NIC 120 also shields the cell delineation details of asynchronous transfer from the applications running on the host system 390. For present purposes, it is assumed that applications running on the host system 390 manage transmit and receive data using wrap around transmit and receive rings with packet interfaces as discussed below. However, the present invention may be practiced with the software applications running on the host system 390 managing transmit and receive data using other data structures.

Figure 3:
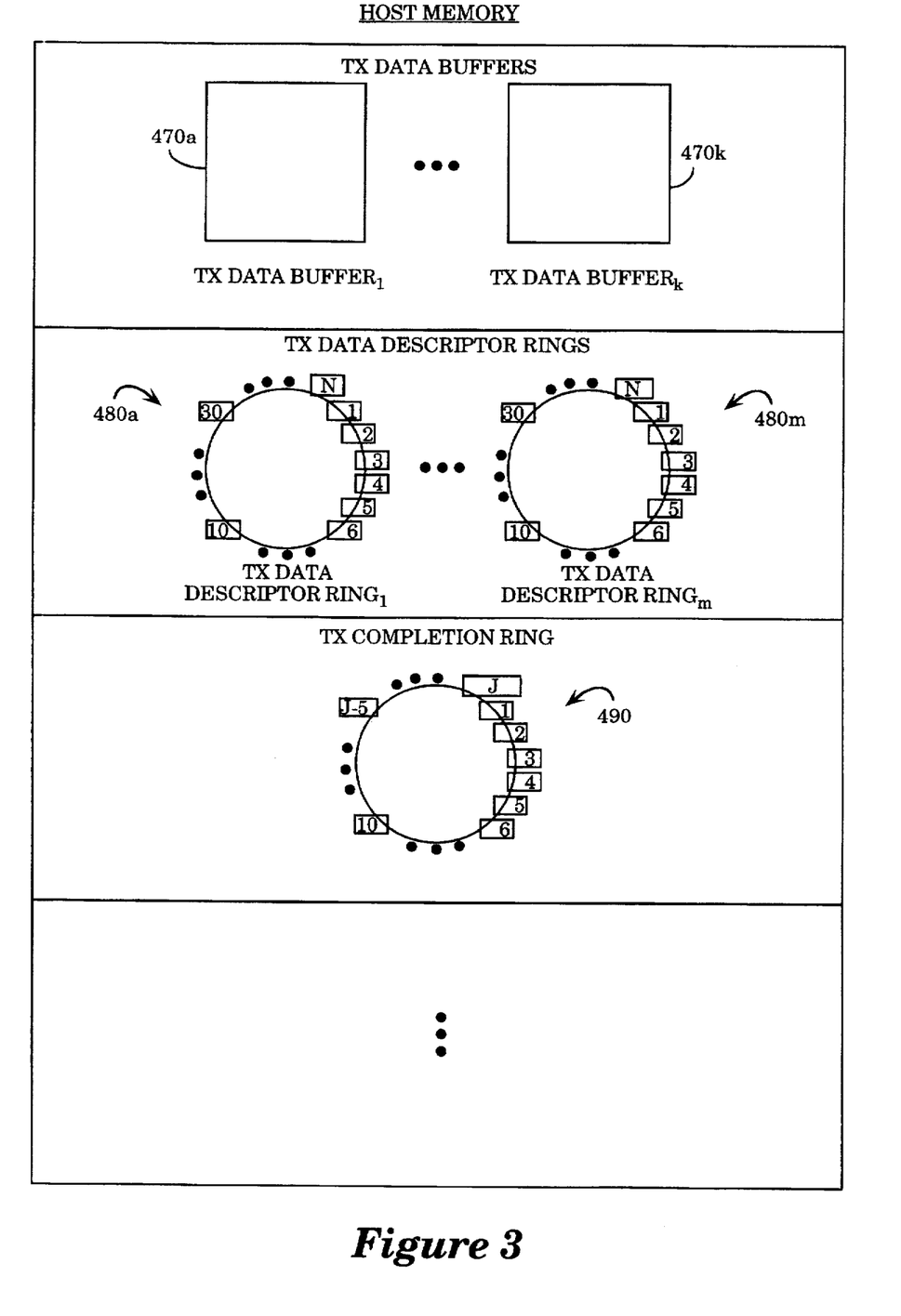
FIG. 3 is an illustrative block diagram of certain data structures of the host memory used by the Network Interface Circuit of FIG. 2 in transmitting data.

Referring now to FIG. 3, a general overview of the preferred data structure of the host memory 395 used for data transmission is shown. The host memory includes transmit ("TX") data buffers 470a–470k, its corresponding TX data descriptor rings 480a–480m and a TX completion ring 490. The TX data buffers 470a–470k are consecutively addressed buffers of a predetermined size within the host memory. The TX data buffers 470a–470k are used to individually store data blocks and to collectively provide a larger storage for communicative media such as video.

The TX data descriptor rings 480a–480m are data structures having a plurality "N" of ring entries, for example, entries 1, 2, 3 and the like. Each of the TX data descriptor rings 480a–480m corresponds to one of the "M" channels, typically of different transfer data rates, supported by the NIC where "M" is a whole number greater than one. Each TX data descriptor ring 480a–480m includes a plurality "N" of ring entries accessed by communications software sequentially and in a circular fashion. Each ring entry is of a sufficient size (e.g., 64 bytes) to contain a "data descriptor" having transmission-related information (e.g., the size of a data block or MPEG frame, etc.) and pointers to a desired data block located in a TX data buffer 470a–470k. The data descriptors on each TX data descriptor ring are numbered 1 to "N", where "N" is a whole number equal to the number of descriptors on each TX data descriptor ring 480a–480m. Typically, there are 1024 data descriptors on a ring i.e., N=1024 and each ring is associated with a pre-programmed bandwidth group. In addition, each data descriptor ring may have one or more data blocks queued for transmission. Preferably, the number of TX data buffers "K" is less than or equal to "M" multiplied by "N" (M×N) since the TX data buffers 470a–470k should be sufficient in number to hold data from N entries and M channels.

When a data descriptor is input into a ring entry and is queued to be subsequently read by the NIC 120, the software running in the host memory issues a "kick" command to the System and ATM Layer Core 220 in the NIC 120 of FIG. 2. This command is a write operation which provides, as parameters, the TX data descriptor ring number (0–126) and the corresponding data descriptor number of the last data descriptor posted in the particular TX data descriptor ring as discussed by Assignee of the present application in a concurrently filed U.S. Patent Application entitled "A Method and Apparatus For Coordinating Data Transfer Between Hardware and Software" (application Ser. No. 08/499,317, filed Jul. 7, 1995 by Rasoul M. Oskouy and Denton E. Gentry) incorporated herewith by reference. This is done to avoid polling the TX data descriptor ring by the NIC which would be costly to employ in most personal computer platforms and unnecessary when no data needs to be transmitted. The NIC keeps track of the last data descriptor, per TX data descriptor ring, that has been processed.

Figure 4:
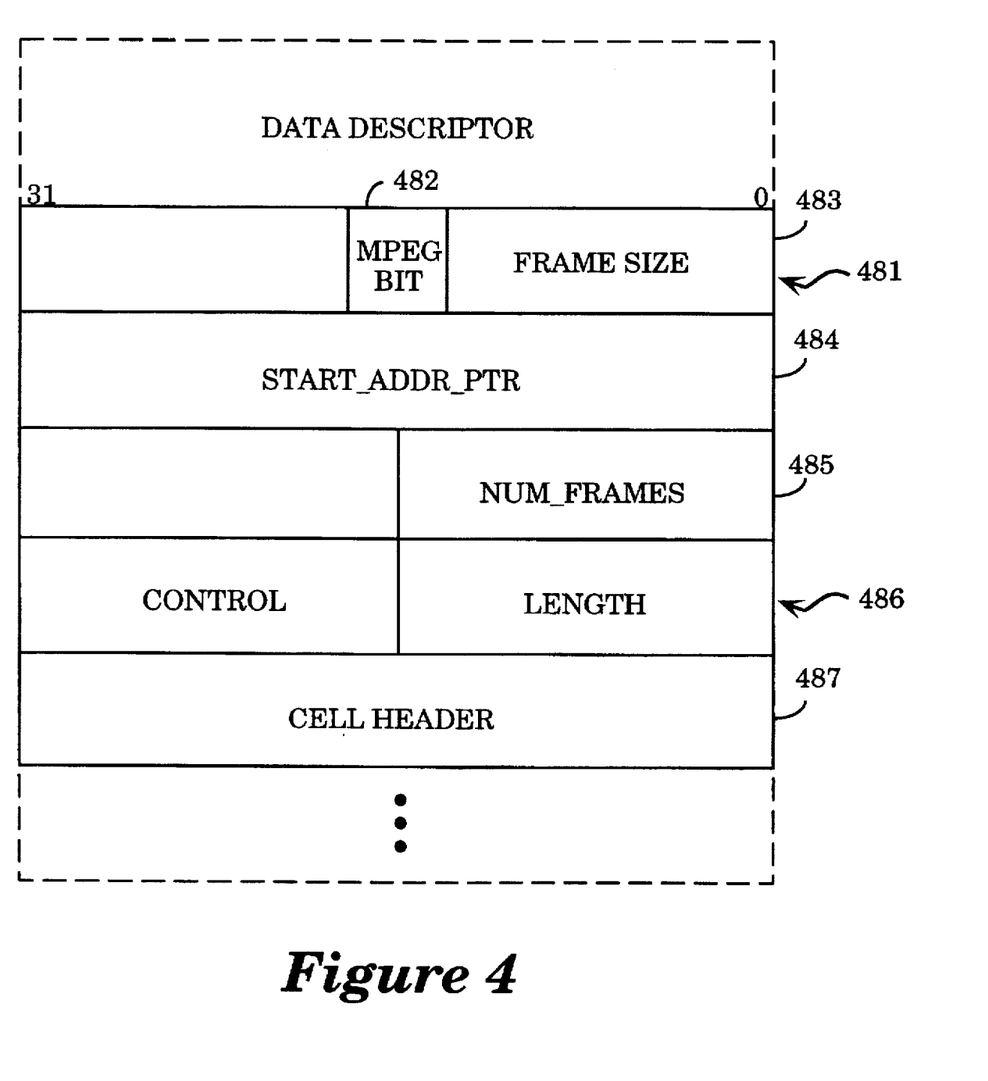
FIG. 4 is an illustrative block diagram of a data descriptor stored in one of the ring entries of the TX data descriptor ring of FIG. 3.

In its preferred embodiment as shown in FIG. 4, each data descriptor of the TX data descriptor rings includes 64 bytes (or 16 words) of information, some of which is used by the TX DMA engine (referenced below) to packetize data from the TX data buffers 470a–470k of host memory. The first word (i.e. 32-bits) 481 of the data descriptor includes least one control bit (hereinafter referred to as "MPEG bit") 482 which, when set, indicates that communications software wants to transfer video through multiple MPEG frames. In the event that the MPEG bit 482 is set, a plurality of bits ("Frame Size") 483 within the first word 481 of the data descriptor, usually dedicated for indicating the buffer length of the TX data buffer associated with the TX data descriptor ring, are used to specify the byte length of a single MPEG frame.

The data descriptor further includes (i) a second word 484 providing the 32-bit start address ("Start_Addr_Ptr") of the first byte of the data block stored in the TX data buffer of this TX data descriptor ring and, if MPEG bit 482 is set, (ii) a third word 485 indicating the number of MPEG frames ("Num_Frames") to be transferred utilizing this same data descriptor. Moreover, the data descriptor includes a fourth word 486 containing control information and payload length ("Cntl/Length") of a resultant cell packet and a fifth word 487 containing the 4-byte cell header ("Cell Header") excluding the one-byte checksum.

Referring back to FIG. 3, the TX completion ring 490 is a data structure having a plurality of ring entries "J" which, unlike TX data descriptor rings 480a–480m, contain all necessary information in the ring entry rather than relying on pointers. The TX completion ring 490 serves as a place holder for the hardware to provide status of a packet that was transferred to the buffer memory 420. Thus, the number of ring entries of the TX completion descriptor ring 490 is "J", where J is less than or equal to M multiplied by N (J≦M×N), since the TX completion ring 490 must have sufficient entries for posting N data descriptors from M channels. The hardware uses a descriptor in the TX completion descriptor ring 490 to provide the corresponding TX data descriptor ring number and data descriptor number corresponding to the data block that was transferred. In a preferred embodiment, the TX completion ring 490 is used to report to hardware the data descriptors which are available for use by the hardware to post updates of completed transactions. Advantageously, the TX completion descriptor ring 490 is accessible by both hardware and software. In addition, the TX completion ring 490 preferably occupies 64 KBytes of host memory through 1,024 ring entries, since it has to be large enough to contain the multiple completion updates from "M" TX data descriptor rings each having N data descriptors.

One function of the System and ATM Layer Core 220 of FIG. 2 is to receive data from host memory for transmission through a specific channel and store this data in a packetized format within the TX buffer memory for later retrieval and insertion into payloads of ATM cells collectively forming a cell packet. This function is accomplished through the collective arbitrated operations of the cellification logic; namely, the TX DMA engine 500, a TX Segmentation engine 510 and a TX Control RAM 520 as shown in FIG. 5.

The TX DMA engine 500 is responsible for retrieving data from the TX data buffer and appropriately packetizing the data in the TX buffer memory. If the data is video requiring MPEG transmission, the DMA engine 500 packetizes the video according to a MPEG packet format as discussed below. The TX Segmentation engine 510 attempts to segment these MPEG packets as soon as they are placed into the TX buffer memory in order to allow the array of TX FIFOs to be smaller in size than its corresponding TX data buffer. The operations of the TX Control RAM 520 in coordinating data transfer from a TX data buffer to the TX buffer memory are discussed in detail in the concurrently filed application by Assignee entitled "Method and Apparatus for Coordinating Data Transfer between Hardware and Software" (Attorney Docket No. 82225.P0934) incorporated herewith by reference.

Figure 5:
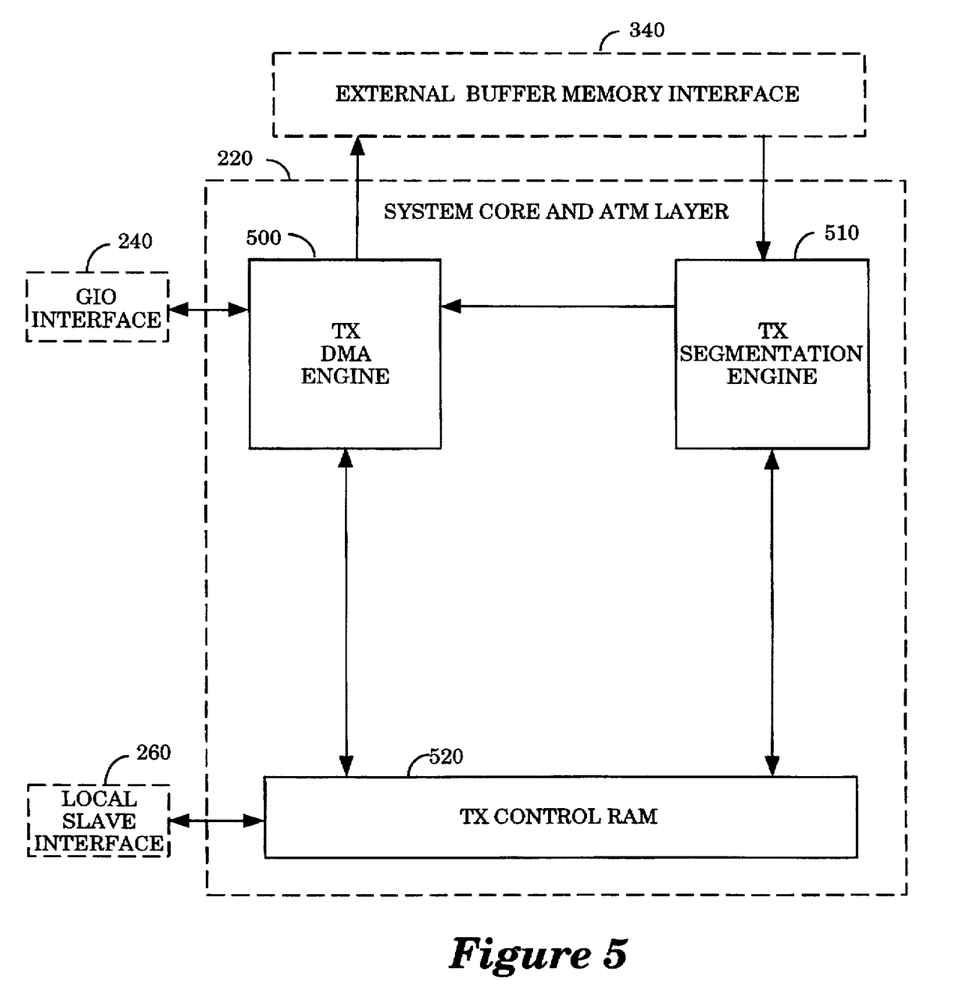
FIG. 5 is an illustrative block diagram of components, including the TX DMA engine and TX Segmentation engine, implemented within the System and ATM Layer Core of the Network Interface Circuit for cellification.

Referring still to FIG. 5, the TX DMA engine 500 packetizes data according to one of at least two different packet formats; namely, a data packet with MPEG segmentation format ("MPEG packet") and a data packet without MPEG segmentation format ("non-MPEG packet"). The type of data packet stored in the TX buffer memory is determined by the contents of the data descriptor as defined above.

Figure 6:
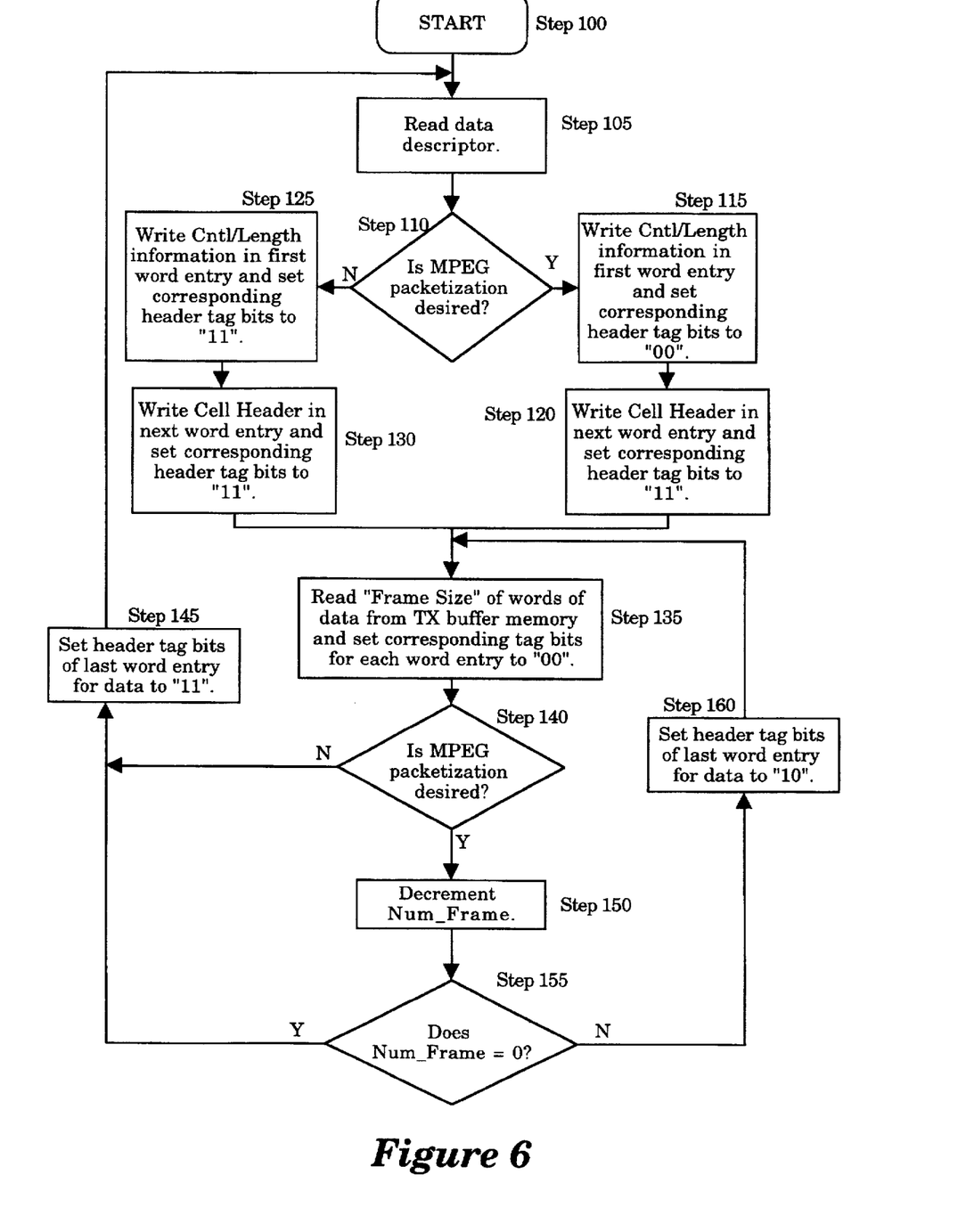
FIG. 6 is an illustrative flowchart featuring the packetizing operations performed by the TX DMA engine of FIG. 5 in storing MPEG packets and non-MPEG packets within the TX buffer memory of FIG. 2.

Referring now to FIGS. 6 and 7, the TX DMA engine initially reads certain overhead parameters of the data descriptor, which is associated with the TX data buffer storing the data block to be transferred through a specific channel, in order to obtain information governing the packetizing operations performed by the TX DMA engine (Step 105). These overhead parameters include (i) MPEG bit; (ii) Length; (iii) Start__Addr__Ptr; (iv) Num__Frames; (v) Cntl/Length; and (vi) Cell Header whose characteristics are described above. Next, the TX DMA engine checks the state of the MPEG bit to determine whether the data block is a number of MPEG frames requiring special MPEG packetization (Step 110).

If MPEG packetization is required, the TX DMA engine packetizes the data block for local storage in a FIFO of the TX buffer memory by writing the Cntl/Length information into a first word entry of the FIFO associated with the specific channel and setting its corresponding header tag bits equal to "00" (Step 115) as shown by a FIFO labeled "FIFO(1)" in FIG. 7. Next, the TX DMA engine writes the Cell Header into a second word entry of FIFO(1) and sets its corresponding header tag bits equal to "11" (Step 120). This packetizing procedure differs from normal operations where the TX DMA engine sets both header tag bits of the first and second tag bits to "11" as shown in Step 125–130 and illustrated as "FIFO(2)" in FIG. 7. The setting of the header tag bits of the first word entry to "00" allows the TX Segmentation engine, during segmentation in pursuit of generating a cell packet, to determine that the data is locally stored as MPEG packets. It is contemplated that the particular tag configuration may be modified without departing from its general purpose.

Thereafter, in accordance with the bit width of the TX buffer memory, a number of bytes defined by the Frame Size parameter are read in sequence by the TX DMA engine and sequentially written into word entries of FIFO(1). The header tag bits associated with each of these word entries is set to "00" by the TX DMA engine except for the last word entry (Step 135). At this point, the TX DMA engine again determines whether the MPEG packetization is desired (Step 140). If the MPEG packetization is not desired indicating normal data storage, the TX DMA engine sets the header tag bits associated with the last word entry to "11" and the same or different data descriptor to obtain its Cntl/Length information and Cell Header (Step 145). However, if the MPEG packetization is desired, the TX DMA engine determines whether there are any more MPEG frames within the TX data buffer to transfer, besides the MPEG frame just packetize (Steps 150 and 155). This may be accomplished by decrementing the Num__Frames parameter stored within the TX DMA engine and checking whether the Num__Frames parameter is now zero.

If the Num__Frames parameter is equal to zero, indicating that the data transfer from the TX data buffer is complete, the TX DMA engine writes "11" into the header tag bits of the last word entry of the MPEG packet as in Step 145. However, if the Num__Frames parameter is not equal to zero, the header tag bits of the last word entry is set to "10" indicating to the TX Segmentation engine that it is the end of a first MPEG packet but other MPEG packets utilizing the same Cntl/Length and Cell Header information are to follow (Step 160). Thereafter, instead of re-accessing the data descriptor and loading the Cntl/Length information and Cell Header as previously done, the TX DMA engine just reads and writes the data associated with the next MPEG packet sequentially into the FIFO(1) as shown in FIG. 7. The TX Segmentation engine, upon detecting the header tag bits of "10", segments the data of the next MPEG packets using the same information Cell Header and Cntl/Length information from the prior MPEG packet as discussed in FIGS. 8a–8b.

Figure 8A:
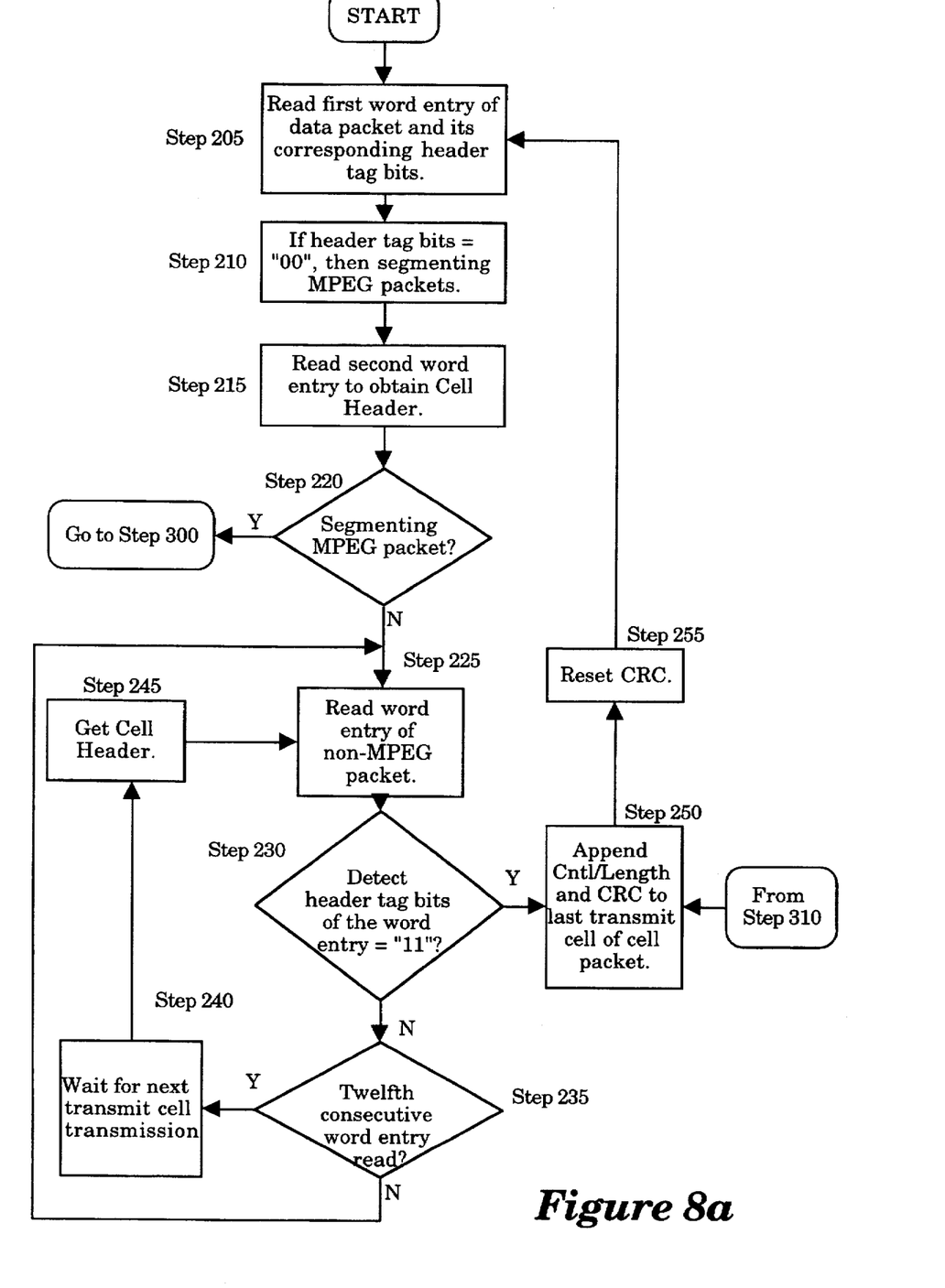
FIGS. 8a–8b are illustrative flowcharts featuring the unloading operations performed by the TX Segmentation engine of FIG. 5 to produce a cell packet for transmission from the Network Interface Circuit of FIG. 2.
Figure 8B:
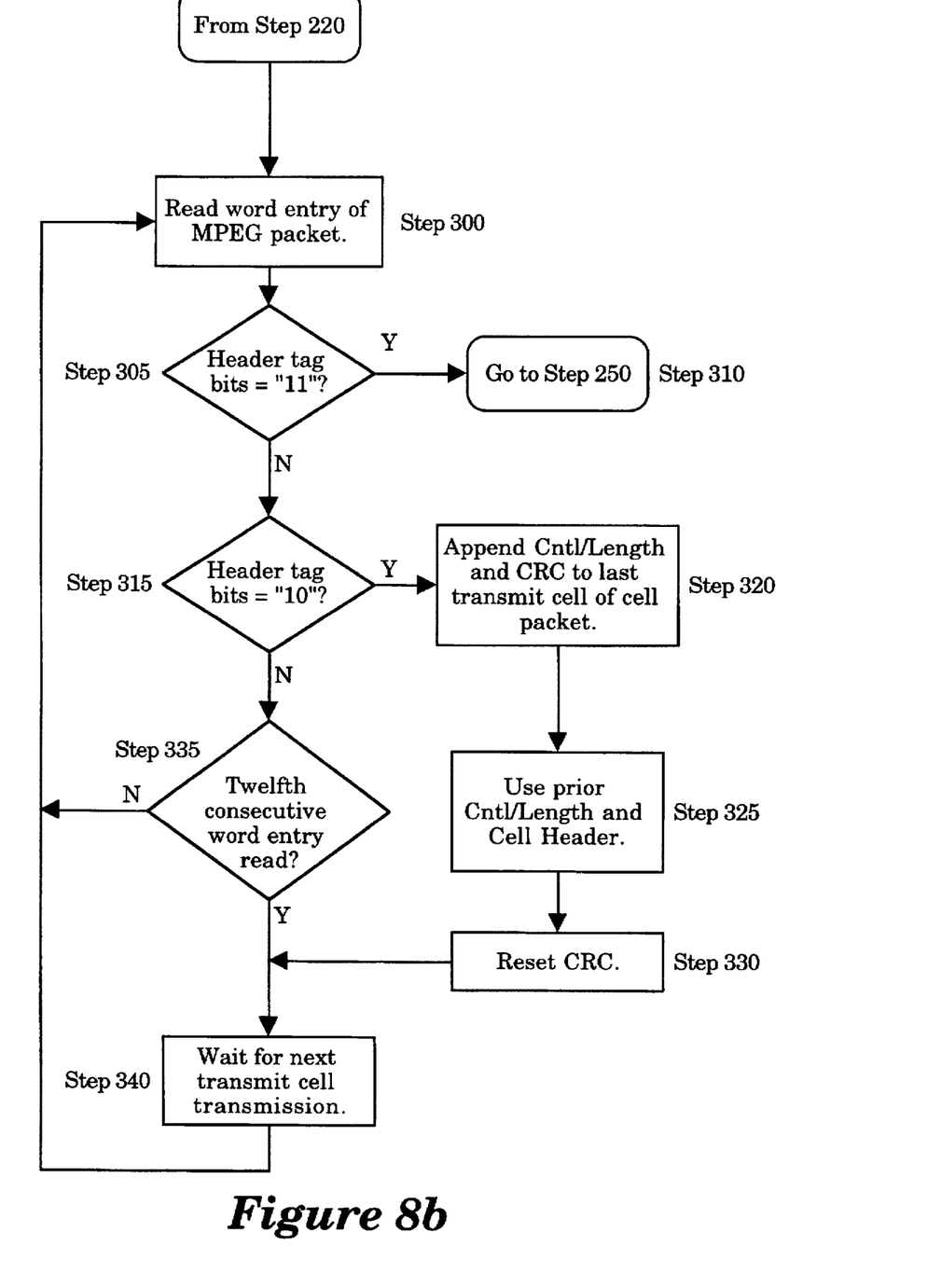

Referring to FIGS. 8a and 8b, as the TX DMA engine is storing the MPEG packets into the FIFOs of the TX buffer memory, the TX Segmentation engine is unloading the data associated with the MPEG packets in order to form cell packets for transmission from the NIC. The TX Segmentation engine first reads the first word entry of the data packet from the FIFO associated with a specific channel number (Step 205). If the TX Segmentation engine detects that the header tag bits of the first word entry are "00", it determines that the information involves MPEG packets which has a later effect on its chosen segmentation procedure (Step 210). In Step 215, the TX Segmentation engine reads a second word in order to obtain the Cell Header. Thereafter, in Step 220, the TX Segmentation engine performs one of two segmentations procedures depending on whether the packets stored in the FIFO are non-MPEG packets or MPEG packets.

If the packets stored in the FIFO are non-MPEG packets, the TX Segmentation engine reads data associated with the data packet until one of two conditions occurs; namely, TX Segmentation engine (i) reads contents of twelve consecutive word entries to obtain twelve words (i.e., 48 bytes) of data from the data packet or (ii) detects a pair of header tag bits to be equal to "11" indicating that its corresponding word entry contains the last bytes valid data within the data block (Steps 225–235). If the first condition occurs, the TX Segmentation engine utilizes the Cell Header for the next cell transmission and continues this process until the second condition occurs (Steps 240–245). If the second condition occurs, the Cntl/Length information as well as independently generated CRC are added to the last transmit cell to produce the cell packet (Step 250). Thereafter, the CRC is reset for subsequent generation for the next cell packet.

If the packets stored in the FIFO are MPEG packets, in Step 300, the TX Segmentation engine reads word entries of the MPEG packet until one of three conditions occurs; namely, the TX Segmentation engine (i) detects header tag bits of "11"; (ii) detects header tag bits of "10" or (iii) reads twelve word entries consecutively, thereby reading twelve words (or 48 bytes) of data from the data packet. If the first condition is first detected, if the header tag bits are "11" indicating that the word entry includes the last valid bytes of the data block (Steps 305–310), the TX Segmentation engine performs the same operations as discussed in Steps 250–255. However, if the TX Segmentation engine detects header tag bits having the value "10" indicating the end of one of multiple MPEG packets associated with the data descriptor, the Cntl/Length information as well as the CRC are appended to the cell packet and the CRC is reset (Steps 315–330). However, unlike the non-MPEG packets, the Cntl/length AND Cell Header information from the previous MPEG packet is used for the next transmit cell(s) to eliminate overhead associated with re-accessing and re-loading the control information into the TX buffer memory. For the third condition, the TX Segmentation engine utilizes the Cell Header for the next transmit cell transmission and continues this procedure until either the first or second condition occur.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A method for optimizing efficiency in transferring a block of data stored in a memory element, the method comprising the steps of:

accessing a plurality of overhead parameters from a data descriptor stored in the memory element, said data descriptor providing information about the block of data;

packetizing the block of data into a plurality of MPEG packets;

segmenting the plurality of MPEG packets to produce a plurality of cell packets, each of said plurality of cell packets contains in common at least one of said plurality of overhead parameters; and loading a ring entry number identifying at least the data descriptor into an entry of a transmit completion ring of the memory element.

2. The method according to claim 1, wherein the step of accessing the plurality of overhead parameters includes the steps of:

checking a control bit in the data descriptor to determine if MPEG packetization is desired; and accessing at least one of the overhead parameters if the control bit is set, the step of accessing at least one of the overhead parameters including the steps of accessing a first overhead parameter being a starting address of the block of data within the memory element, and accessing a second overhead parameter being a frame number indicating the number of MPEG frames contained in the block of data.

3. The method according to claim 2, wherein said step of accessing at least one of the overhead parameters further includes the step of accessing a third overhead parameter being a frame size indicating the number of bytes in each MPEG frame of said block of data.

4. The method according to claim 3, wherein said step of accessing at least one of the overhead parameters further includes the steps of accessing a fourth overhead parameter being a control and length field providing control information and total payload length information for each of the plurality of cell packets; and accessing a fifth overhead parameter being a cell header providing header information for each of the plurality of cell packets.

5. The method according to claim 4, wherein the step of accessing the plurality of overhead parameters includes the step of storing the fourth and fifth overhead parameters in a transmit buffer memory for use by the plurality of cell packets.

6. The method according to claim 2, wherein said packetizing step includes the steps of (i) reading a MPEG frame of a plurality of MPEG frames forming the block of data from the memory element;

(ii) storing the MPEG frame as a corresponding MPEG packet in the transmit buffer memory;

(iii) setting at least one header tag bit associated with each word of the MPEG packet to a first predetermined value; and (iv) decrementing the frame number by one, wherein if the frame number is greater than zero, setting the at least one header tag bit associated with a last word of the MPEG packet to a second predetermined value and continue performing steps (i)–(iv) on a successive frame, and if the frame number is equal to zero, setting the at least one header tag bit associated with the last word of the MPEG packet to a third predetermined value and returning to access a plurality of overhead parameters associated with a second data descriptor stored in the memory element, said second data descriptor providing control information about a second block of data.

7. The method according to claim 6, wherein said segmenting step includes the steps of (i) determining whether the plurality of MPEG packets are being stored in the transmit buffer memory; and (ii) reading in succession each word entry of a MPEG packet of the plurality of MPEG packets, wherein the reading step includes the step of appending contents of a control and length field to a cell packet of the plurality of cell packets corresponding to the MPEG packet, provided a first condition is detected.

8. The method according to claim 7, wherein the first condition is the at least one header tag bit of the word entry indicates that the word entry is storing a last byte of the block of data.

9. The method according to claim 7, wherein the reading step further includes the step of appending the contents of the control and length field to the cell packet of the plurality of cell packets corresponding to the MPEG packet; and using the overhead parameters associated with the MPEG packet for producing a cell packet of the plurality of cell packets corresponding to the subsequent MPEG packet, provided a second condition is detected.

10. The method according to claim 9, wherein the second condition is the at least one header tag bit of the word entry indicates that the word entry is storing a last byte of the MPEG packet to be followed by a subsequent MPEG packet.

11. The method according to claim 9, wherein the reading step further includes the step of continuing construction of the cell packet corresponding to the MPEG packet provided a third condition is detected, said third condition is the word entry is a twelfth consecutive word entry to be read.

12. The method according to claim 11, wherein the reading step further includes the step of continuing the reading step for a next successive word entry of the MPEG packet, provided the first, second and third conditions are not detected.

13. A circuit for optimizing efficiency in transferring a block of data from a memory element to a transmit buffer memory, the circuit comprising:

a transmit DMA engine coupled to the transmit buffer memory, said transmit DMA engine accesses a plurality of overhead parameters from a data descriptor stored in the memory element, and packetizes the block of data into a plurality of packets, and sets header tag bits for each of the plurality of packets to provide information about its content; and a transmit segmentation engine coupled to the transmit buffer memory, the transmit segmentation engine segmenting the plurality of packets to accommodate variations in memory size of the transmit buffer memory.

14. The circuit according to claim 13, wherein said transmit DMA engine packetizes the block of data having a plurality of MPEG frame by (i) reading a MPEG frame of said plurality of MPEG frames from the memory element, (ii) storing the MPEG frame as a corresponding MPEG packet in the transmit buffer memory, (iii) setting at least one header tag bit associated with each word of the MPEG packet to a first predetermined value, and (iv) decrementing a frame number being one of the plurality of overhead parameters indicating the number of MPEG frames in the block of data.

15. The circuit according to claim 14, wherein said transmit DMA engine sets the at least one header tag bits associated with a last word of the MPEG packet to a second predetermined value and continues performing steps (i)–(iv) on a successive frame, if the frame number is greater than zero, and sets the at least one header tag bits associated with the last word of the MPEG packet to a third predetermined value and waits to access a plurality of overhead parameters associated with a second data descriptor stored in the element memory, if the frame number is equal to zero, said second data descriptor providing control information about a second block of data.

16. The circuit according to claim 13, wherein said transmit segmentation engine further segmenting the plurality of packets in order to produce a plurality of cell packets transmitted from the circuit, each of said plurality of cell packets contains in common at least one of said plurality of overhead parameters.

17. A network interface circuit for enabling a host system including host memory to communicate with a remote system, the network interface circuit comprising:

a system bus interface coupled to the host system in order to access a block of data stored in the host memory;

a transmit buffer memory coupled to the system bus interface;

a system and ATM layer core configured to convert the block of data into a plurality of cell packets suitable for transmission to the remote system, the system and ATM layer core including a transmit DMA engine coupled to said transmit buffer memory, said transmit DMA engine being configured to access a plurality of overhead parameters from a data descriptor stored in the memory element, to packetize the block of data into a plurality of MPEG packets and to set at least one header tag bit for each word in the MPEG packet to indicate a location of the word in the plurality of MPEG frames, and a transmit segmentation engine coupled to said transmit buffer memory, said transmit segmentation engine being configured to segment the plurality of MPEG packets in order to produce the plurality of cell packets.

18. The network interface circuit according to claim 17, wherein said transmit DMA engine packetizes the block of data by (i) reading a MPEG frame of said plurality of MPEG frames from the memory element, (ii) storing the MPEG frame as a corresponding MPEG packet in the transmit buffer memory, (iii) setting at least one header tag bit associated with each word of the MPEG packet to a first predetermined value, and (iv) decrementing a frame number being one of the plurality of overhead parameter indicating the number of MPEG frames in the block of data, wherein if the frame number is greater than zero,
the transmit DMA engine sets the at least one header tag bits associated with a last word of the MPEG packet to a second predetermined value and continues performing steps (i)–(iv) on a successive frame, and if the frame number is equal to zero,
the transmit DMA engine sets the at least one header tag bits associated with the last word of the MPEG packet to a third predetermined value and waits to access a plurality of overhead parameters associated with a second data descriptor stored in the element memory, said second data descriptor providing control information about a second block of data.

19. The network interface circuit according to claim 18, wherein each MPEG packet of the plurality of MPEG packets corresponds to and is produced from one of the plurality of MPEG frames.

20. A method for optimizing efficiency in transferring a block of data in a memory element, the method comprising the steps of:

accessing a plurality of overhead parameters from a data descriptor pointing to the block of data;

packetizing the block of data into a plurality of packets; and segmenting the plurality of packets to produce a plurality of cell packets, each of the plurality of cell packets contains in common at least one of said plurality of overhead parameters; and loading a ring number identifying the data description into an entry of a transmit completion ring of the memory element upon completion of transmission of the plurality of cell packets.

* * * * *